(12) United States Patent
Naruse (10) Patent No.: US 8,537,265 B2
(45) Date of Patent: Sep. 17, 2013

(54) IMAGING APPARATUS AND METHOD OF SETTING IN-FOCUS CONDITION

(75) Inventor: Tadashi Naruse, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 13/331,721

(22) Filed: Dec. 20, 2011

(65) Prior Publication Data

US 2012/0154612 A1 Jun. 21, 2012

(30) Foreign Application Priority Data

Dec. 20, 2010 (JP) .................................. 2010-282557
Nov. 10, 2011 (KR) ......................... 10-2011-0117168

(51) Int. Cl.
| | |
|---|---|
| H04N 5/232 | (2006.01) |
| H04N 5/228 | (2006.01) |
| H04N 3/00 | (2006.01) |
| G03B 17/00 | (2006.01) |
| G06K 9/40 | (2006.01) |

(52) U.S. Cl.
USPC ........ 348/345; 348/208.4; 348/326; 348/352; 396/82; 396/87; 396/91; 396/131; 396/102; 382/255; 382/238

(58) Field of Classification Search
USPC ................ 348/345–361; 396/82, 87, 91, 93, 396/131, 102, 103; 382/255, 238
See application file for complete search history.

(56) References Cited

U.S. PATENT DOCUMENTS

2005/0146788 A1* 7/2005 Costales ....................... 359/464
2011/0305445 A1* 12/2011 Yasuda et al. .................. 396/78

FOREIGN PATENT DOCUMENTS

| JP | 2009-049951 | 3/2009 |
|---|---|---|
| JP | 2009049951 A * | 3/2009 |

* cited by examiner

Primary Examiner — Nhan T Tran
Assistant Examiner — Marly Camargo
(74) Attorney, Agent, or Firm — Drinker Biddle & Reath LLP (57) ABSTRACT

An imaging apparatus that determines in-focus conditions according to a user's taste by using auto-focus (AF). The imaging apparatus including an AF unit, that allows the user to input an in-focus operation start command, and that allows the user to input a main photographing start command. The imaging apparatus includes a photographing environment storing unit that stores photographing stop and start data, an assumed in-focus condition group generating unit that generates an assumed in-focus condition group based on at least the photographing stop data, an assumption confirming unit that confirms the assumed in-focus condition group, and an in-focus condition group changing unit that, if an in-focus success rate for the assumed in-focus condition group is higher than for the default in-focus condition group, changes the default in-focus condition group to the assumed in-focus condition group.

16 Claims, 6 Drawing Sheets

IMAGING APPARATUS AND METHOD OF SETTING IN-FOCUS CONDITION

CROSS-REFERENCE TO RELATED PATENT APPLICATION

This application claims the benefit of Japan Patent Application No. 2010-282557, filed on Dec. 20, 2010 in the Japan Patent Office, the entire disclosure of which is incorporated herein by reference, and claims the benefit of Korean Patent Application No. 2011-0117168, filed on Nov. 10, 2011, in the Korean Intellectual Property Office, the entire disclosure of which is incorporated herein by reference.

BACKGROUND

1. Field of the Invention

The invention relates to an imaging apparatus that performs auto-focus (AF) based on a group of in-focus conditions and a method of automatically setting the in-focus conditions.

2. Description of the Related Art

Many digital cameras are configured to automatically focus by using a method of performing auto-focus (AF) such as contrast measurement so that users may take a photograph without having to manually focus. Often, auto-focus is initiated by the user half pressing a shutter button. Methods of performing AF often use a group of in-focus conditions to evaluate how focused an image is. The in-focus conditions may include conditions that indicate that only a portion of the image such as whether or not a subject included in the image is in focus, and whether or not a particular area of the subject such as the face is in-focus. Often, the AF method controls the lens and iris. The AF method may move the lens through a range of positions to find a position with a high AF value, which is calculated using the in-focus conditions. Once the AF method finds the position with the high AF value, the user may capture an image if the user finds the image pleasing. Often the user captures the image by fully pressing the shutter button.

The in-focus conditions that are used by the AF method may not be the in-focus conditions that a user prefers. For example, the in-focus conditions may heavily favor weighting an area of the image that includes a subject's face when the user of the digital camera would prefer that more weight be given to a larger area of the image such as a group of people.

The AF method will position the lens and iris in different positions and thus produce different images depending on the in-focus conditions. Some in-focus conditions will produce images that are more pleasing to a particular user than other in-focus conditions. One camera is configured to measure how pleasing an image is to a user in the following way. An external sensor is attached to the user that senses a psychological state of the user. The sensor transmits the psychological state to the camera. The camera then can determine how pleased a user is by using the information from the external sensor attached to the user. The camera then measures the psychological state of the user after an image is displayed on a viewer of the camera and adjusts the in-focus conditions to try and produce images that are more pleasing to a user.

However, external sensors may increase the cost of the camera and be inconvenient for the user to wear.

SUMMARY

Therefore, there is a need in the art for a method, and imaging apparatus, the imaging apparatus including an auto-focus (AF) unit configured to automatically focus on a subject based on a default in-focus condition group that comprises a plurality of previously set in-focus conditions; a first input mechanism configured to allow a user to input an in-focus operation start command for starting an in-focus operation of the AF unit; a second input mechanism configured to allow the user to input a main photographing start command for starting main photographing with the focus achieved by the AF unit; a photographing environment storing unit configured to store photographing stop data comprising an AF result when the in-focus operation start command is input and the main photographing start command is not input from the user; a virtual in-focus condition group generating unit configured to generate an assumed in-focus condition group by estimating an in-focus condition overriding to the user from among the plurality of in-focus conditions of the default in-focus condition group and changing a set value of at least one in-focus condition or a weighted value allocated to at least one in-focus condition based on the photographing stop data; an assumption confirming unit configured to set the default in-focus condition group or the assumed in-focus condition group to be used by the AF unit during photographing, and configured to confirm the assumed in-focus condition group based on a photographing success rate, wherein the photographing success rate is a ratio of a number of times the in-focus operation start command is input to a number of times the main photographing start command is input when the default in-focus condition group is set, or correspondingly when the assumed in-focus condition group is set; and an in-focus condition group changing unit configured to change the default in-focus condition group to be the assumed in-focus condition group if it is confirmed by the assumption confirming unit that an in-focus success rate determined for the assumed in-focus condition group is higher by a predetermined value than an in-focus success rate determined for the default in-focus condition group.

The photographing environment storing unit may further store photographing start data including an AF result when the in-focus operation start command is input and the main photographing start command is input from the user.

The assumed in-focus condition group generating unit may further be configured to generate the assumed in-focus condition group based on the photographing stop data and the photographing start data.

The default and assumed in-focus condition group may include a condition regarding a position of an in-focus area in an image.

The default and assumed in-focus condition group may include a condition regarding a face detection of the subject.

The default and assumed in-focus condition group may include a condition regarding exposure of the image.

The imaging apparatus may include a hand shake alarming unit configured to detect the user's hand shake and indicate a hand shake alarm if there is a hand shake during the in-focus operation.

The photographing environment storing unit may further be configured such that the photographing stop data stores whether the hand shake alarm is displayed.

The assumed in-focus condition group generating unit may further be configured to specify an in-focus condition that generates an AF result if photographing is stopped even when the hand shake alarm is not indicated and generates the assumed in-focus condition group by reducing a weighted value allocated to the specified in-focus condition.

The photographing environment storing unit, the assumed in-focus condition group generating unit, the assumption confirming unit, and the in-focus condition changing unit may operate during an idle time.

A method of setting an in-focus condition group on an imaging apparatus is disclosed. The imaging apparatus may include an auto-focus (AF) unit that automatically focuses on a subject based on a default in-focus condition group that comprises a plurality of preset in-focus conditions, a first input mechanism that allows a user to input an in-focus operation start command for starting an in-focus operation to the AF unit, and a second input mechanism that allows the user to input a main photographing start command for starting main photographing with the focus achieved by the AF unit.

The method of setting an in-focus condition group may include storing photographing stop data comprising an AF result when the in-focus operation start command is input and the main photographing start command is not input from the user; generating an assumed in-focus condition group by estimating an in-focus condition overriding to the user from among the plurality of in-focus conditions of the default in-focus condition group and changing a set value of each in-focus condition or a weighted value allocated to each in-focus condition based on the photographing stop data; setting any one of the default in-focus condition group and the assumed in-focus condition group by using the AF unit during each instance of photographing, and confirming the assumed in-focus condition group based on an in-focus success rate that refers to a ratio of a number of times the in-focus operation start command is input to a number of times the main photographing start command is input of each in-focus condition group; and changing the assumed in-focus condition group as the default in-focus condition group, if it is confirmed by the assumption confirming unit that a photographing success rate when the assumed in-focus condition group is set is higher by a predetermined value than a photographing success rate when a current in-focus condition group is set.

The storing may include storing photographing start data comprising an AF result when the in-focus operation start command is input and the main photographing start command is input from the user.

The generating of the assumed in-focus condition group may include generating the assumed in-focus condition group based on the photographing stop data and the photographing start data.

The in-focus condition may be a condition about a position of an in-focus area in an image.

The in-focus condition may be a condition about face detection of the subject.

The in-focus condition may be a condition about exposure.

The imaging apparatus may include a hand shake alarming unit that detects the user's hand shake and displays a hand shake alarm when there is a hand shake during the in-focus operation.

The storing may include storing whether the hand shake alarm is displayed as the photographing stop data.

The generating of the assumed in-focus condition may include generating the assumed in-focus condition group by specifying an in-focus condition that generates an AF result when photographing is stopped even if the hand shake alarm is not displayed and reducing a weighted value allocated to the specified in-focus condition.

The storing, the generating of the assumed in-focus condition group, the confirming of the assumed in-focus condition group, and the changing of the assumed in-focus condition may be performed during an idle time in which the imaging apparatus does not take a photograph.

An imaging apparatus is disclosed. The imaging apparatus may include an auto-focus (AF) unit configured to focus on a subject based on a default in-focus condition group; a first input unit configured to input an in-focus operation start command for starting an in-focus operation to the AF unit; a second input unit configured to input a main photographing start command for starting main photographing with the focus achieved by the AF unit; a photographing environment storing unit configured to store photographing stop data comprising an AF result when the in-focus operation start command is input and the main photographing start command is not input, and photographing start data comprising an AF result when the main photographing start command is input; an assumed in-focus condition group generating unit configured to generate an assumed in-focus condition group from among the default in-focus condition group based on the photographing stop data and the photographing start data; an assumption confirming unit configured to set the default in-focus condition group or the assumed in-focus condition group to be used by the AF unit during photographing, and configured to confirm the assumed in-focus condition group based on a photographing success rate, wherein the photographing success rate is a ratio of a number of times the in-focus operation start command is input to a number of times the main photographing start command is input for either the default in-focus condition group or the assumed in-focus condition group; and an in-focus condition group changing unit configured to change the assumed in-focus condition group as the default in-focus condition group, if it is confirmed by the assumption confirming unit that an in-focus success rate when the assumed in-focus condition group is set is higher by a predetermined value than an in-focus success rate when the default in-focus condition group is set.

The in-focus condition group may include at least one of a condition about an in-focus area in an image, a condition about face detection of the subject, and a condition about exposure.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The invention will now be described more fully with reference to the accompanying drawings, in which exemplary embodiments of the invention are shown. A digital camera is illustrated as an example of an imaging apparatus in the following embodiments. However, the invention is not limited to a digital camera, and another digital device such as a digital camcorder, a personal digital assistant (PDA), or a smart phone may be used. The embodiments of the invention will be explained with reference to the attached drawings.

Description of Overall Structure of Imaging Apparatus

Figure 1:
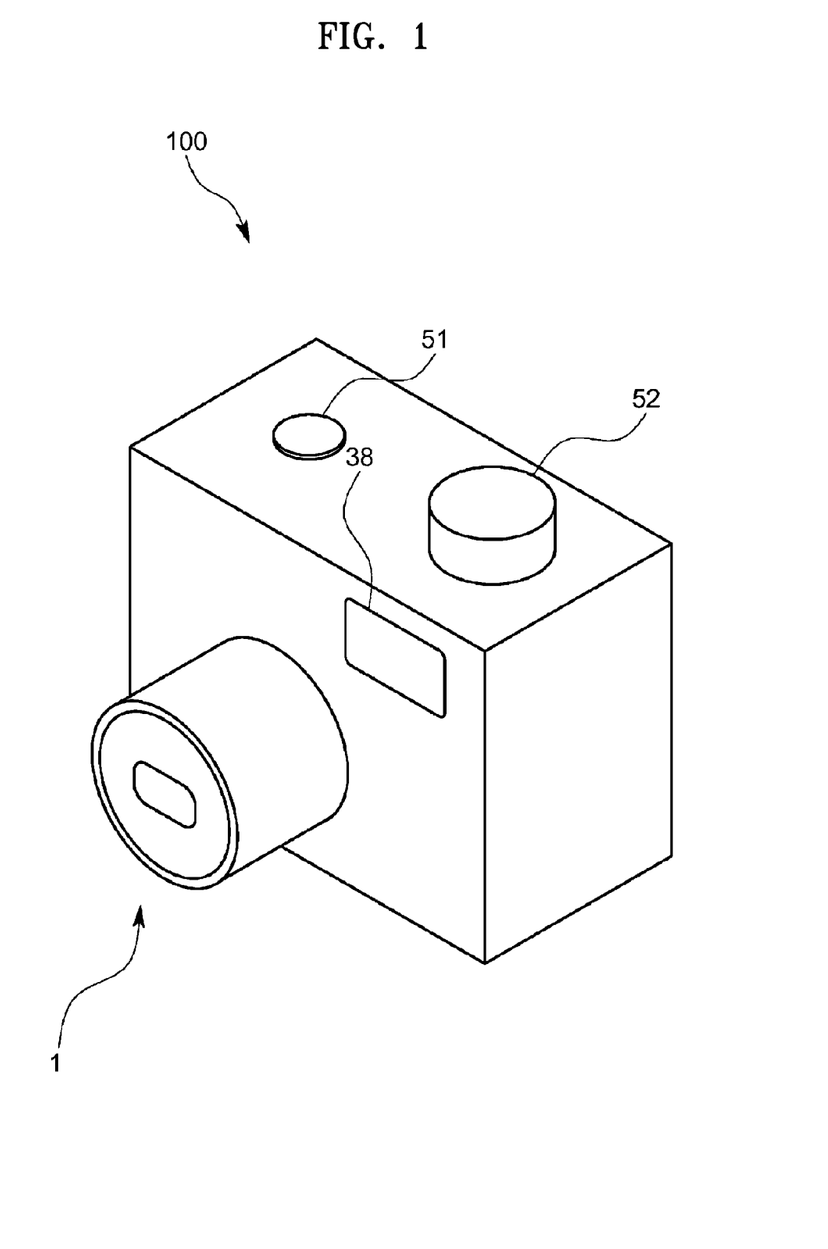
FIG. 1 is a front perspective view illustrating an example of an imaging apparatus according to an embodiment of the invention.
Figure 2:
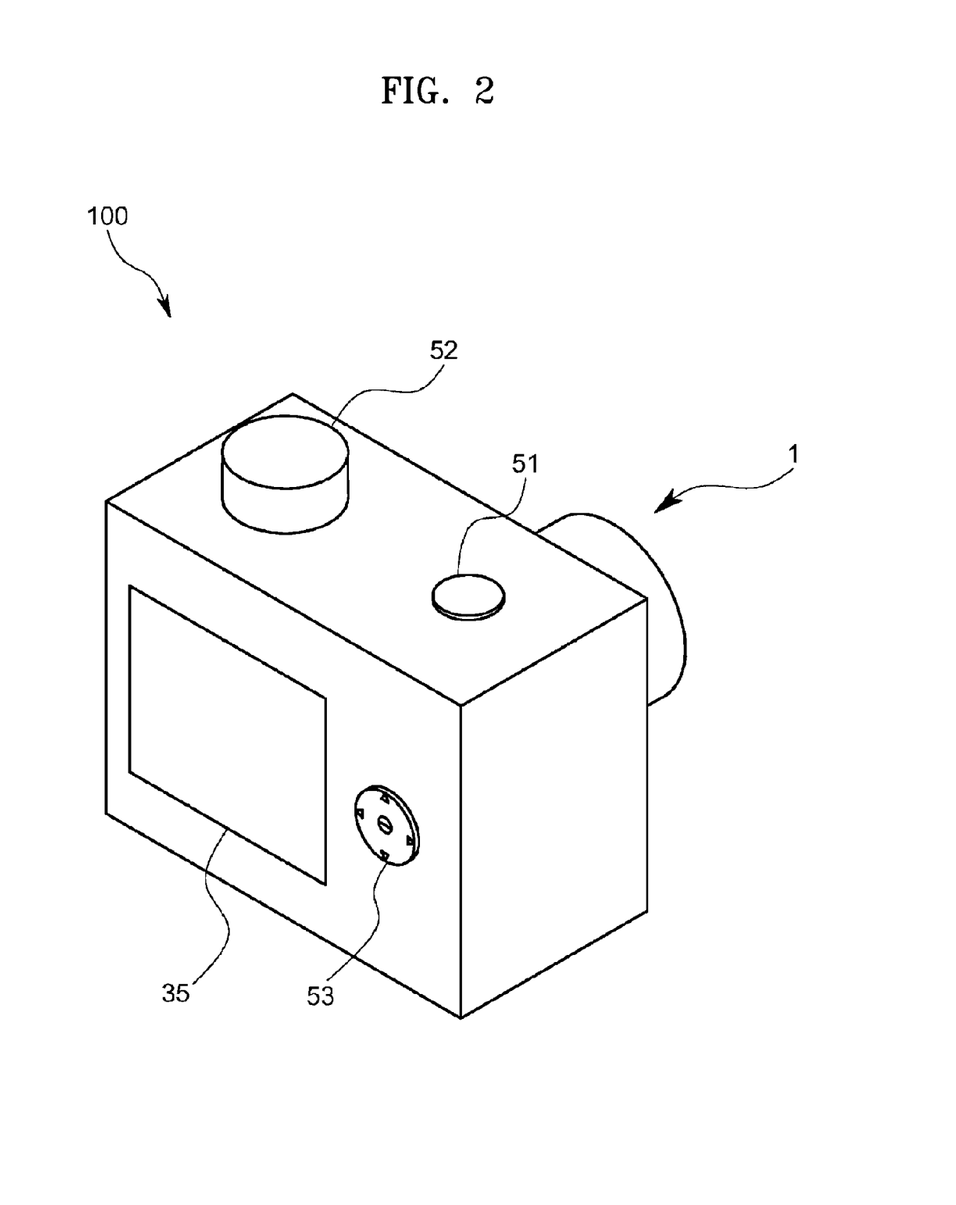
FIG. 2 is a rear perspective view illustrating the imaging apparatus of FIG. 1.

FIG. 1 is a front perspective view illustrating an imaging apparatus 100 according to an embodiment of the invention. Referring to FIG. 1, a lens holder that supports an imaging optical system 1 is provided on a front surface of the imaging apparatus 100 to protrude from the front surface of the imaging apparatus 100 when power is turned on, and a strobe device 38 is also provided on the front surface of the imaging apparatus 100. When power is turned off, the lens holder retreats into the imaging apparatus 100. FIG. 2 is a rear perspective view illustrating the imaging apparatus 100 of FIG. 1. Referring to FIG. 2, a monitor 35 that may show a live-view image or stored image and operation keys 53 that are used to perform various functions are provided on a rear surface of the imaging apparatus 100. A shutter button 51 that is used to perform a shutter-release operation and a mode dial 53 that is used to change a photographing mode are provided on a top surface of the imaging apparatus 100.

Figure 3:
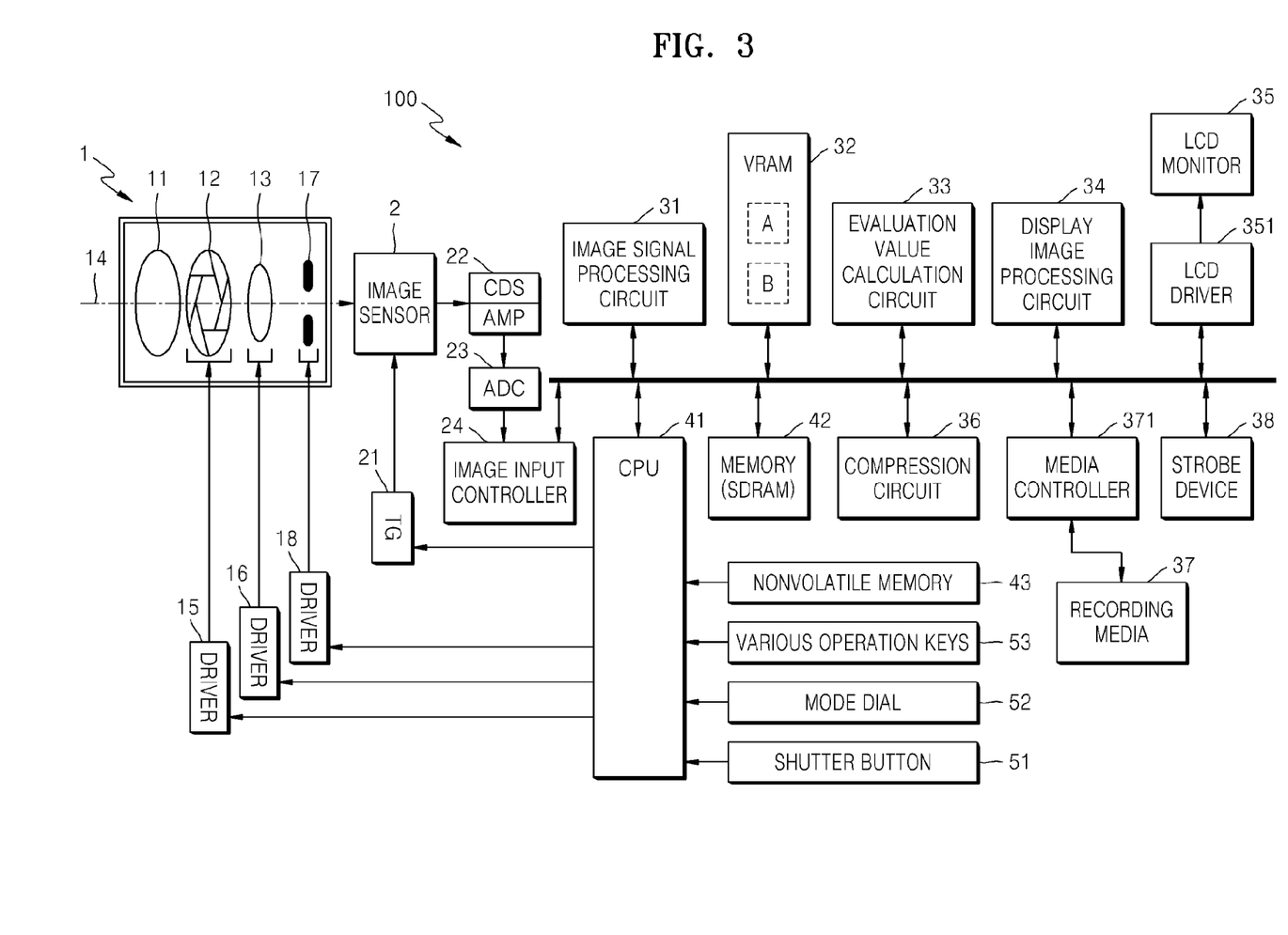
FIG. 3 is a block diagram illustrating an example of an electrical structure of the imaging apparatus of FIG. 1.

FIG. 3 is a block diagram illustrating an electrical structure of the imaging apparatus 100 of FIG. 1. Referring to FIG. 3, the imaging optical system 1, an image sensor 2, an image signal processing circuit 31, a video random access memory (VRAM) 32, an evaluation value calculation circuit 33, a display image processing circuit 34, a lcd monitor 35, a compression circuit 36, a recording media 37, a central processing unit (CPU) 41, a synchronous dynamic random access memory (SDRAM) 42, a media controller 371, and a nonvolatile memory 43 are configured to cooperate to perform a function of a digital camera. Each element will be explained below.

The imaging optical system 1 includes a zoom lens 11, an iris 12, a focus lens 13, and a shutter 17 that are sequentially arranged from the outside along an optical axis 14. The image sensor 2 is disposed behind the focus lens 13. The image sensor 2 may be, for example, a charge-coupled device (CCD) or complementary metal-oxide-semiconductor (CMOS) image sensor.

An iris motor is connected to the iris 12 and is used to change a value of the iris 12 during an auto-exposure (AE) operation to control the amount of light to which the image sensor 2 is exposed. A lens motor is connected to the focus lens 13, and is configured to achieve focus by controlling a focus position of the imaging optical system 1 by moving the focus lens 13 along the optical axis 14 of the imaging optical system 1 during an auto-focus (AF) operation.

The image sensor 2 changes an image of a subject formed by the imaging optical system 1 into an image signal. A timing generator (TG) 21 is connected to the image sensor 2, and controls accumulation and transferring of charges of the image sensor 2. The amount of light to which the image sensor 2 is exposed may be controlled by controlling a charge accumulation and transfer time. In addition, the iris 12, the focus lens 13, and the shutter 17 are controlled by means of drivers 15, 16, and 18, respectively, and the image sensor 2 is controlled by means of the TG 21 by the CPU 41.

An image signal output from the image sensor 2 is sequentially input to a correlated double sampling (CDS) amplifier (AMP) 22, and an analog/digital converter (ADC) 23, to change from analog data to digital data. Input/output of the image signal converted to the digital data is controlled by an image input controller 24. The amount of exposed light may also be controlled by controlling a gain of the AMP 22. The image signal is input to the image signal processing circuit 31 to be subjected to white balance correction and gamma correction, and is stored in predetermined regions A and B of the VRAM 32 as a live-view image on the monitor 35. Each image stored in the VRAM 32 is updated at predetermined intervals. For example, each image may be updated whenever the image sensor 2 is exposed to light at intervals of 1/30 second (1 frame) by the timing generator 21 to output an image signal.

The evaluation value calculation circuit 33 calculates an AF evaluation value and an AE evaluation value from an image stored in the VRAM 32. The AF evaluation value corresponds to, for example, a contrast evaluation value. Also, the contrast evaluation value may be calculated by multiplying a predetermined region of each image by a high frequency component of a luminance value. That is, contrasts (i.e., luminance differences) between adjacent pixels in a predetermined region are summed. Also, the AE evaluation value is calculated by multiplying a predetermined region of each piece of image data by a luminance value and is an average luminance value of each image. The contrast evaluation value and the AE evaluation value are used in an AF operation and an AE operation to be explained below.

The display image processing circuit 34 performs a process of displaying a live-view image on the LCD monitor 35 based on an image stored in the VRAM 32. The compression circuit 36 compresses the image stored in the VRAM 32 by using a method such as JPEG. A media controller 371 controls each image compressed by the compressing circuit 36 to be stored in the record medium 37, which may be a memory card. When a view mode is selected by using a mode dial 52, a three-dimensional (3D) image generated by the display image processing circuit 34 is displayed on the monitor 35 based on the image stored in the record medium 37.

The CPU 41 controls an overall operation of the imaging apparatus 100. The nonvolatile memory 43, the shutter button 51, the mode dial 52, and the various operation keys 53 are connected to the CPU 41.

The shutter button 51, which functions as a first input mechanism and a second input mechanism, is configured to be pressed in two steps. When the shutter button 51 is pressed halfway by the user, an in-focus operation start command is input to the CPU 41 to start an in-focus operation. When the shutter button 51 is pressed completely, a main photographing start command is input to the CPU 41 to start photographing, and an image corresponding to a frame is transmitted from the VRAM 32 to the record medium 37 and stored in the record medium 37. When a reproduction mode is selected by using the mode dial 52, the image stored in the record medium 37 is subjected to a predetermined process by the display image processing circuit 34 and then is displayed on the LCD monitor 35.

Description of Configuration for Making AF Result Suitable for User's Taste

Figure 4:
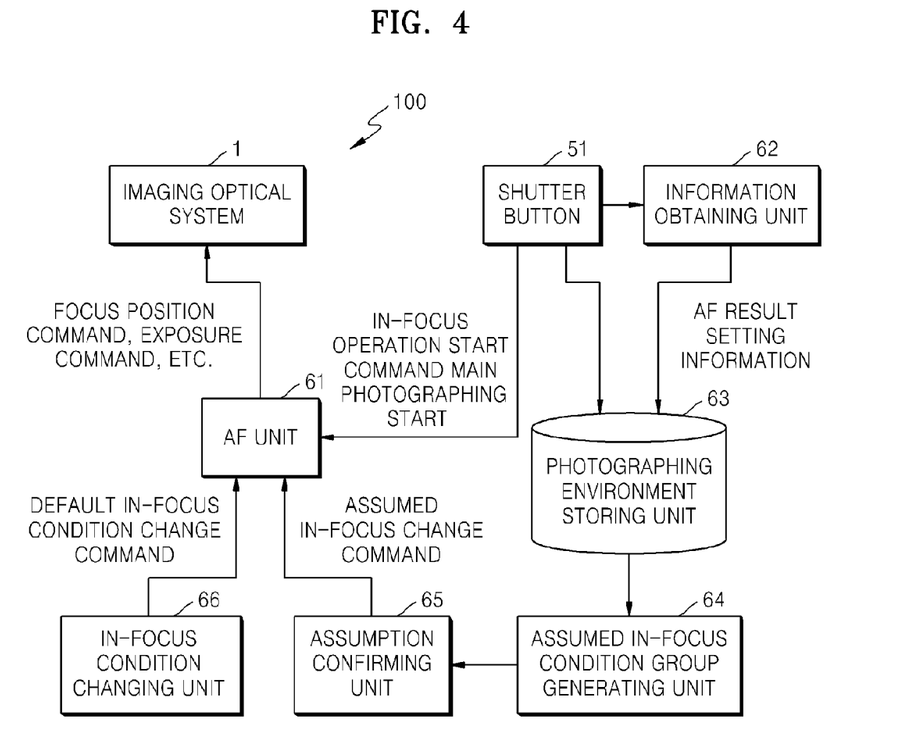
FIG. 4 is a block diagram illustrating an example structure of the imaging apparatus of FIG. 1.

FIG. 4 is an example of a block diagram illustrating a structure of the imaging apparatus 100 of FIG. 1. Various control programs and information are stored in the nonvolatile memory 43. The CPU 41, the SDRAM 42, the nonvolatile memory 43, and the record medium 37 are configured to cooperate to perform functions of at least an AF unit 61, an information obtaining unit 62, a hand shake alarming unit (not shown), a photographing environment storing unit 63, an assumed in-focus condition group generating unit 64, an assumption confirming unit 65, and an in-focus condition group changing unit 66, based on the programs and the information. Although not shown in FIG. 4, the imaging apparatus 100 may include a detection mechanism for detecting a hand shake.

The AF unit 61 automatically focuses on a subject based on a default in-focus condition group that includes a plurality of in-focus conditions and is set previously to beginning the auto focusing. The AF unit 61 drives the focus lens 13 in the imaging optical system 1 (refer to FIG. 3) to focus on a subject in a predetermined region of an image by performing contrast AF in the predetermined region of the image. Also, the AF unit 61 controls the iris 12 to change a luminance value of the image to an appropriate value in an in-focus state. Here, an in-focus condition may be any one of various conditions such as a condition about a position of an in-focus area where contrast AF is performed by obtaining a contrast evaluation value, a condition about whether a face is focused, and a condition about the exposure or luminance of a region that is focused. In embodiments, a permission of whether or not the condition can be adjusted and a weighted value (importance) are allocated to each in-focus condition. In embodiments, the AF unit 61, goes through a process where it adjust portions of the imaging optical system 1 (refer to FIG. 3), and computes an in-focus value for different images captured for different configurations of the imaging optical system 1 to determine which configuration of the imaging optical system 1 will likely produce the image with the highest in-focus value according to the in-focus condition group. So, the in-focus condition group is used to calculate the in-focus value, and thus used to determine how in-focus an image is.

The hand shake alarming unit detects a user's hand shake, and displays a hand shake alarm on the monitor 35 when there is a hand shake during the in-focus operation.

The photographing environment storing unit 63 stores photographing stop data including an AF result when the shutter button 51 is pressed halfway by the user to input the in-focus operation start command, which initiates the auto-focusing process, and then the shutter button 51 is not pressed completely but is released not to input the main photographing start command. The photographing stop data indicates that the user started the auto-focusing process, but did not capture an image. The photographing environment storing unit 63 may also store photographing start data including an AF result when the shutter button 51 is pressed completely by the user to input the main photographing start command. The photographing start data indicates that the user started the auto-focusing process, and did capture an image.

The photographing stop data and the photographing start data are obtained by the information obtaining unit 62 from each element of the imaging apparatus 100. For example, information about a position of an in-focus area when AF is completed, information about characteristics of a face when the face is detected, or information about the luminance of an image is obtained from each element. Also, when such an AF result is obtained, information about weighted values allocated to the in-focus conditions of the default in-focus condition group is also obtained from the AF unit 61 by the information obtaining unit 62. In embodiments, each piece of data is separately stored according to whether the shutter button 51 is pressed halfway and then released, or the shutter button 51 is pressed halfway and then pressed completely. In particular, when photographing is stopped when the hand shake alarming unit does not display the hand shake alarm, an identifier indicating its intention is included in the photographing stop data.

The assumed in-focus condition group generating unit 64 estimates an in-focus condition overriding to the user from among the plurality of in-focus conditions of the default in-focus condition group and generates an assumed in-focus condition group by changing a set value such as an allowance or a threshold value of each in-focus condition, or a weighted value allocated to each in-focus condition. In particular, since the photographing stop data when the hand shake alarm is not displayed is regarded as data in which there is no problem in photographing when photographing is stopped but in which an AF result is not suitable for the user's taste, an in-focus condition that is not important may be estimated by estimating a non-preferred factor from the photographing stop data.

Figure 5:
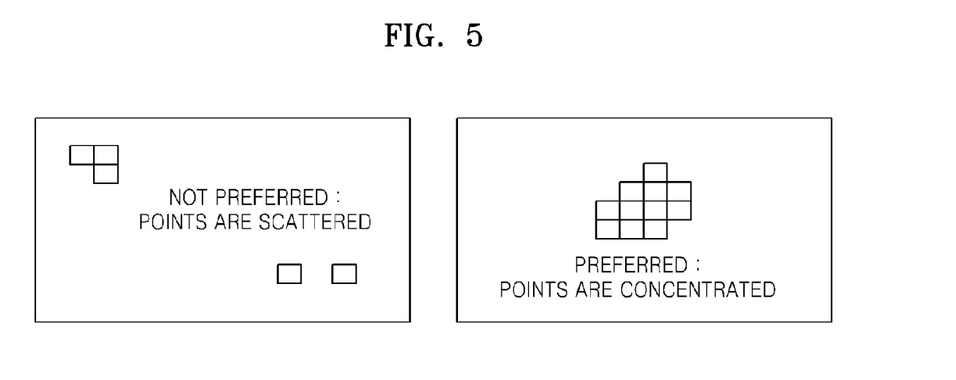
FIG. 5 is a view illustrating an example of a user's taste about an auto-focus (AF) result.

By contrast, since the photographing start data is regarded as data suitable for the user's taste, the photographing start data is used to estimate an in-focus condition that is important. As such, the assumed in-focus condition group generating unit 64 generates the assumed in-focus condition group by changing a weighted value allocated to at least one in-focus condition from the default in-focus condition group based on at least data stored in the photographing environment storing unit 63. For example, when a photographing success rate when points are concentrated on a central portion is higher than a photographing success rate when points are scattered as shown in FIG. 5, a weighted value is allocated to an in-focus condition corresponding to the central portion and is such that the central portion is given more weight to be focused. Also, when face detection is possible and a photographing success rate when a certain person's face is focused is high, a weighted value is allocated to an in-focus condition corresponding to the person's face and is such that the person's face is focused above all. Also, a threshold value with regard to face detection is changed accordingly. In embodiments, the assumed in-focus condition group generating unit 64, generates an assumed in-focus condition group based on at least the data in the photographing environment storing unit, and the default in-focus condition group.

The assumption confirming unit 65 sets either the default in-focus condition group or the assumed in-focus condition group to be used by the AF unit 61 for auto-focusing during photographing. The assumption confirming unit 65 may also determine whether the assumed in-focus condition group is to be used based on a photographing success rate, that is, a rate that refers to a ratio of a number of times the in-focus operation start command is input to a number of times the main photographing start command is input, of each in-focus condition group.

In embodiments, the assumption confirming unit 65 sometimes sets the assumed in-focus condition group to be used by the AF unit 61 instead of the default in-focus condition group. In embodiments, when photographing is stopped prematurely or successfully completed, the assumed in-focus condition group is returned to the default in-focus condition group.

The in-focus condition group changing unit 66 changes the default in-focus condition group to be the assumed in-focus condition group, if the assumption confirming unit 65 determines that the in-focus success rate is higher by a predetermined amount when the assumed in-focus condition group is used to perform auto-focusing rather than the default in-focus condition group. In embodiments, an in-focus success means that the user pressed the shutter button 51 (see FIG. 1) half way down to focus the image and then pressed the shutter button 51 all the way down to capture the focused image. In embodiments, the assumption confirming unit 65 determines that it is not a success if the user presses the shutter button 51 half way, but does not press the shutter button 51 all the way down to capture the focused image.

In the imaging apparatus 100 constructed as described above, a method of estimating and determining use of the assumed in-focus condition group for easily generating an AF result preferred by the user based on the user's input to the shutter button 51 will be explained.

Figure 6:
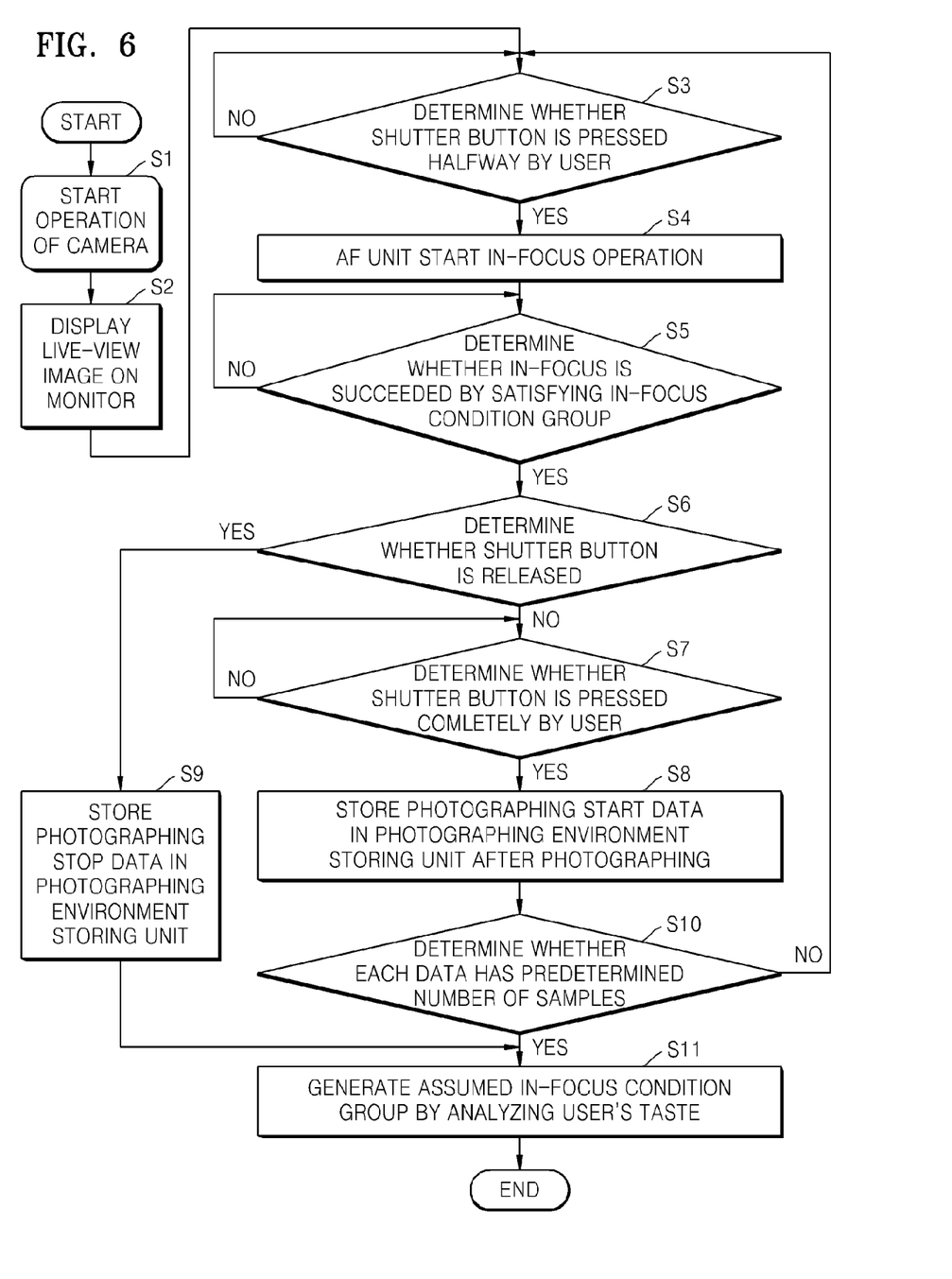
FIG. 6 is a flowchart illustrating an example of a method of estimating a user's taste about an AF result and generating an assumed in-focus condition group.

FIG. 6 is a flowchart illustrating an example of a method of estimating an assumed in-focus condition group, according to an embodiment of the invention.

It is assumed that an automatic mode is selected by using the mode dial 52 and thus items related to photographing such as light metering, an AF area, and a shutter speed are automatically selected by the imaging apparatus 100. In embodiments, the photographing environment storing unit 63, the assumed in-focus condition group setting unit, the assumption confirming unit 65, and the in-focus condition group changing unit 66 are configured to operate during an idle time in which photographing and various other operations are not basically performed.

In operation S1, the imaging apparatus 100 starts operating. In operation S2, a live-view image is displayed on the monitor 35 and the imaging apparatus 100 enters a standby mode in which a user's input is awaited. In operation S3, it is determined whether the user is pressing the shutter button 51 halfway. If it is determined in operation S3 that the user is pressing the shutter button 51 halfway, the method proceeds to operation S4. In operation S4, the AF unit 61 starts operating to automatically focus on a subject based on a default in-focus condition group. In operation S5, it is determined whether an in-focus area in an in-focus condition is focused by using, for example, contrast AF. If it is determined that the in-focus area in the in-focus condition is focused in operation S5, the method proceeds to operation S6. In operation S6, it is determined whether the shutter button 50 pressed halfway by the user is released. If it is determined in operation S6 that the shutter button 50 is not released, the method proceeds to operation S7. In operation S7, it is determined whether the shutter button 51 is pressed completely by the user to start main photographing. If it is determined in operation S7 that the shutter button 51 is pressed completely by the user, the method proceeds to operation S8. In operation S8, photographing start data is stored in the photographing environment storing unit 63 after photographing. If it is determined in operation S6 that the shutter button 51 pressed halfway by the user is released, the method proceeds to operation S9. In operation S9, photographing stop data is stored in the photographing environment storing unit 63. In operation S10, it is determined whether a sufficient number of samples is obtained. Operation S3 through operation S9 are repeatedly performed until there is a sufficient number of samples of both the photographing start data and the photographing stop data. If it is determined in operation S10 that the sufficient number of samples of the photographing start data and the photographing stop data has been obtained, the method proceeds to operation S11. In operation S11, the assumed in-focus condition group generating unit 64 generates an assumed in-focus condition group of in-focus conditions that may generate an AF result with a high photographing success rate by analyzing the user's taste based on the collected data.

The assumed in-focus condition group is estimated through operations S1 through S11 as described above.

Figure 7:
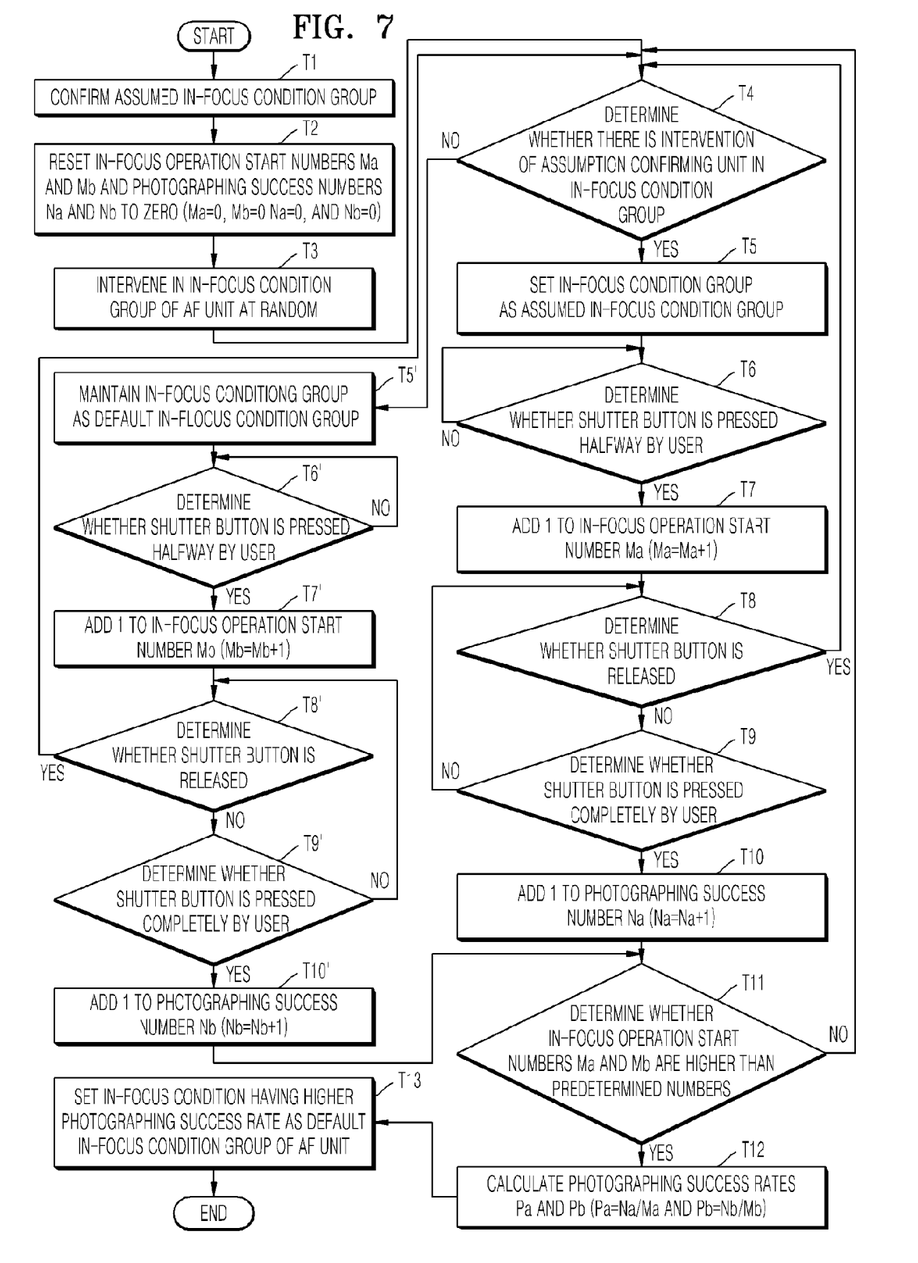
FIG. 7 is an example of a flowchart illustrating a method of determining whether the assumed in-focus condition group is to be used.

FIG. 7 is a flowchart illustrating an example of a method of determining whether an assumed in-focus condition group is to be used. In operation T1, an assumed in-focus condition group is generated and use thereof is determined by the assumption confirming unit 65. In operation T2, in-focus operation start numbers Ma and Mb and photographing success numbers Na and Nb are set to zero, and counting thereof begins when the assumed in-focus condition group and a default in-focus condition group are set by the AF unit 61. In operation T3, the assumption confirming unit 65 intervenes in the AF unit 61 by setting the default in-focus condition group as the assumed in-focus condition group. In embodiments, the assumption confirming unit 65 may intervene at random. In other embodiments, the assumption confirming unit 65 may intervene in fixed intervals or in another manner appropriate to gather data on whether to change to the default in-focus condition group to the assumed in-focus condition group. In operation T4, it is determined whether the assumption confirming unit 65 has intervened. If it is determined in operation T4 that the assumption confirming unit 65 has intervened, the method proceeds to operation T5. In operation T5, the default in-focus condition group is changed to the assumed in-focus condition group. In operation T6, it is determined whether a user is pressing the shutter button 51 halfway. If it is determined in operation T6 that the user is pressing the shutter button 51 halfway, the method proceeds to operation T7. In operation T7, 1 is added to the in-focus operation start number Ma. In operation T8, it is determined whether the shutter button 51 is released. If it is determined in operation T8 that the shutter button 51 is released, the method returns to operation T4. If it is determined in operation T8 that the shutter button 51 is not released, the method proceeds to operation T9. In operation T9, it is determined whether the shutter button 51 is pressed completely. If it is determined in operation T9 that the shutter button 51 is pressed completely, the method proceeds to operation T10. In operation T10, 1 is added to the photographing success number Na.

If it is determined in operation T4 that the assumption confirming unit 65 has not intervened, the method proceeds to operation T5'. In operation T5', the AF unit 61 continuously maintains the default in-focus condition group. Operations T5' through T10' correspond to operations T5 through T10. Operations T3 through T10 or T10' are repeatedly performed until a number of samples of the in-focus condition groups is a sufficient number, that is, until a sum of the in-focus operation start numbers Ma and Mb is higher than a predetermined value.

In operation T11, it is determined whether the number of samples is a sufficient number. If it is determined in operation T11 that the number of samples is the sufficient number, the method proceeds to operation T12. In operation T12, the assumption confirming unit 65 calculates photographing success rates Pa and Pb (Pa=Na/Ma and Pb=Nb/Mb) of the in-focus condition groups. In operation T13, when the photographing success rate Pa based on the assumed in-focus condition group is higher than the photographing success rate Pb based on the default in-focus condition group, the in-focus condition group changing unit 66 changes the default in-focus condition group to the assumed in-focus condition group. When the photographing success rate Pa based on the assumed in-focus condition group is less than the photographing success rate Pb based on the default in-focus condition group, the in-focus condition group changing unit 66 maintains the default in-focus condition group. In embodiments, the method of estimating an assumed in-focus condition group of FIG. 6 is performed again.

According to the imaging apparatus and the method of setting an in-focus condition group according to the invention, a user's taste or preference about an AF result may be automatically estimated while photographing is repeatedly performed based at least on an input to the shutter button 51 and an in-focus condition group may be changed to obtain a result of the estimation. Accordingly, without using an external sensor or the like for sensing the user's psychological state, an in-focus condition group may be changed to one suitable for the user's taste based on the user's use of the imaging apparatus 100. Also, since a default in-focus condition group is changed after a taste estimated from an input to the shutter 51 is determined, the imaging apparatus 100 is prevented from being inconveniently used due to wrong estimation and is used according to the user's taste.

While the above explanation has been made based on an example of improving the default in-focus condition group such as the position of an in-focus area, other in-focus conditions may be optimized. For example, the aforesaid method may be performed even when a condition about which person's face is focused from among a plurality of people whose faces are detected is improved. In detail, when a photographing success rate when a user's child is focused is high, a default in-focus condition group may be changed to focus on the user's child, so that only the user's child may be easily photographed even when there are many other children in a school or the like.

While an operation of estimating an assumption about a user's taste and an operation of determining use of the assumption are alternately performed in the above embodiments, the operations may be performed at the same time. Also, while photographing stop data is collected when photographing is stopped, the photographing stop data may be collected when photographing is stopped even when a hand shake alarm is not displayed. Also, not only the hand shake alarm but also a red-eye alarm may be included in the photographing stop data, and may be used when the user's taste is estimated.

While a taste is estimated and an assumption is confirmed based on whether a shutter button is pressed halfway or completely in the above embodiments, the first input mechanism and the second input mechanism are not limited to the shutter button. For example, the first input mechanism and the second input mechanism may be a touch panel of a monitor, or many other ways known in the art for focusing and then capturing the focused image. Various other modifications may be made within the scope of the invention.

As described above, according to an imaging apparatus and a method of setting an in-focus condition group according to the invention, since an in-focus condition group is automatically changed to one suitable for a user's taste based on only data input by the user by using an input mechanism such as a shutter button basically provided on the imaging apparatus, an AF result having high user satisfaction may be obtained.

The device described herein may include a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as magnetic storage media (e.g., read-only memories (ROMs), random-access memories (RAMs), floppy discs, or hard discs) and optical data storage media (e.g., compact disc-read-only memories (CD-ROMs) or digital versatile discs (DVDs)). The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with many different programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. An imaging apparatus comprising:
an auto-focus (AF) unit configured to automatically focus on a subject based on a default in-focus condition group that comprises a plurality of in-focus conditions;

a first input mechanism configured to allow a user to input an in-focus operation start command for starting an in-focus operation of the AF unit;

a second input mechanism configured to allow the user to input a main photographing start command for starting main photographing with the focus achieved by the AF unit;

a photographing environment storing unit configured to store photographing stop data comprising an AF result when the in-focus operation start command is input and the main photographing start command is not input from the user;

a virtual in-focus condition group generating unit configured to generate an assumed in-focus condition group by estimating an in-focus condition that may be more preferable to the user from among the plurality of in-focus conditions of the default in-focus condition group and changing a set value of at least one in-focus condition of the default in-focus condition group or a weighted value allocated to at least one in-focus condition based on the photographing stop data;

an assumption confirming unit configured to set the default in-focus condition group or the assumed in-focus condition group to be used by the AF unit during photographing, and configured to determine a success rate, wherein the success rate is a ratio of a number of times the in-focus operation start command is input to a number of times the main photographing start command is input when the default in-focus condition group is set, or correspondingly when the assumed in-focus condition group is set; and an in-focus condition group changing unit configured to change the default in-focus condition group to be the assumed in-focus condition group if an in-focus success rate determined for the assumed in-focus condition group is higher by a predetermined value than an in-focus success rate determined for the default in-focus condition group.

2. The imaging apparatus of claim 1, wherein the photographing environment storing unit further stores photographing start data comprising an AF result when the in-focus operation start command is input and the main photographing start command is input from the user, wherein the assumed in-focus condition group generating unit is further configured to generate the assumed in-focus condition group based on the photographing stop data and the photographing start data.

3. The imaging apparatus of claim 1, wherein the default and assumed in-focus condition group comprises a condition regarding a position of an in-focus area in an image.

4. The imaging apparatus of claim 1, wherein the default and assumed in-focus condition group comprises a condition regarding a face detection of the subject.

5. The imaging apparatus of claim 1, wherein the default and assumed in-focus condition group comprises a condition regarding exposure of the image.

6. The imaging apparatus of claim 1, further comprising a hand shake alarming unit configured to detect the user's hand shake and indicate a hand shake alarm if there is a hand shake during the in-focus operation, wherein the photographing environment storing unit is further configured such that the photographing stop data stores whether the hand shake alarm is displayed, wherein the assumed in-focus condition group generating unit is further configured to specify an in-focus condition that generates an AF result if photographing is stopped even when the hand shake alarm is not indicated and generates the assumed in-focus condition group by reducing a weighted value allocated to the specified in-focus condition.

7. The imaging apparatus of claim 1, wherein the photographing environment storing unit, the assumed in-focus condition group generating unit, the assumption confirming unit, and the in-focus condition changing unit operate during an idle time.

8. A method of setting an in-focus condition group on an imaging apparatus comprising an auto-focus (AF) unit that automatically focuses on a subject based on a default in-focus condition group that comprises a plurality of preset in-focus conditions, a first input mechanism that allows a user to input an in-focus operation start command for starting an in-focus operation to the AF unit, and a second input mechanism that allows the user to input a main photographing start command for starting main photographing with the focus achieved by the AF unit, the method comprising:

storing photographing stop data comprising an AF result when the in-focus operation start command is input and the main photographing start command is not input from the user;

generating an assumed in-focus condition group by estimating an in-focus condition overriding to the user from among the plurality of in-focus conditions of the default in-focus condition group and changing a set value of each in-focus condition or a weighted value allocated to each in-focus condition based on the photographing stop data;

setting any one of the default in-focus condition group and the assumed in-focus condition group by using the AF unit during each instance of photographing, and confirming the assumed in-focus condition group based on an in-focus success rate that refers to a ratio of a number of times the in-focus operation start command is input to a number of times the main photographing start command is input of each in-focus condition group; and changing the assumed in-focus condition group as the default in-focus condition group, if it is confirmed by the assumption confirming unit that a photographing success rate when the assumed in-focus condition group is set is higher by a predetermined value than a photographing success rate when a current in-focus condition group is set.

9. The method of claim 8, wherein the storing further comprises storing photographing start data comprising an AF result when the in-focus operation start command is input and the main photographing start command is input from the user, wherein the generating of the assumed in-focus condition group comprises generating the assumed in-focus condition group based on the photographing stop data and the photographing start data.

10. The method of claim 8, wherein the in-focus condition is a condition about a position of an in-focus area in an image.

11. The method of claim 8, wherein the in-focus condition is a condition about face detection of the subject.

12. The method of claim 8, wherein the in-focus condition is a condition about exposure.

13. The method of claim 8, wherein the imaging apparatus further comprises a hand shake alarming unit that detects the user's hand shake and displays a hand shake alarm when there is a hand shake during the in-focus operation, and wherein the storing comprises storing whether the hand shake alarm is displayed as the photographing stop data, wherein the generating of the assumed in-focus condition comprises generating the assumed in-focus condition group by specifying an in-focus condition that generates an AF result when photographing is stopped even if the hand shake alarm is not displayed and reducing a weighted value allocated to the specified in-focus condition.

14. The method of claim 8, wherein the storing, the generating of the assumed in-focus condition group, the confirming of the assumed in-focus condition group, and the changing of the assumed in-focus condition are performed during an idle time in which the imaging apparatus does not take a photograph.

15. An imaging apparatus comprising:
an auto-focus (AF) unit configured to focus on a subject based on a default in-focus condition group;
a first input unit configured to input an in-focus operation start command for starting an in-focus operation to the AF unit;
a second input unit configured to input a main photographing start command for starting main photographing with the focus achieved by the AF unit;
a photographing environment storing unit configured to store photographing stop data comprising an AF result when the in-focus operation start command is input and the main photographing start command is not input, and photographing start data comprising an AF result when the main photographing start command is input;
an assumed in-focus condition group generating unit configured to generate an assumed in-focus condition group from among the default in-focus condition group based on the photographing stop data and the photographing start data;
an assumption confirming unit configured to set the default in-focus condition group or the assumed in-focus condition group to be used by the AF unit during photographing, and configured to confirm the assumed in-focus condition group based on a photographing success rate, wherein the photographing success rate is a ratio of a number of times the in-focus operation start command is input to a number of times the main photographing start command is input for either the default in-focus condition group or the assumed in-focus condition group; and
an in-focus condition group changing unit configured to change the assumed in-focus condition group as the default in-focus condition group, if it is confirmed by the assumption confirming unit that an in-focus success rate when the assumed in-focus condition group is set is higher by a predetermined value than an in-focus success rate when the default in-focus condition group is set.

16. The imaging apparatus of claim 15, wherein the in-focus condition group comprises at least one of a condition about an in-focus area in an image, a condition about face detection of the subject, and a condition about exposure.

* * * * *